(12) United States Patent
McCaffrey et al.

(10) Patent No.: US 6,984,812 B2
(45) Date of Patent: Jan. 10, 2006

(54) AUTO REGISTERED COMPONENT RGB IMAGING METHOD

(75) Inventors: Nathaniel Joseph McCaffrey, Stockton, NJ (US); Taner Dosluoglu, New York, NY (US)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 275 days.

(21) Appl. No.: 10/647,719

(22) Filed: Aug. 25, 2003

(65) Prior Publication Data

US 2004/0164226 A1    Aug. 26, 2004

Related U.S. Application Data

(60) Provisional application No. 60/450,088, filed on Feb. 26, 2003.

(51) Int. Cl.
*H01L 27/00* (2006.01)

(52) U.S. Cl. ................................. 250/208.1; 250/226

(58) Field of Classification Search .................... None
See application file for complete search history.

(56) References Cited

U.S. PATENT DOCUMENTS

| 4,926,249 A | * 5/1990 | Ichihara et al. ............. 358/511 |
| 5,333,076 A | 7/1994 | Wight ........................ 359/556 |
| 6,211,906 B1 | 4/2001 | Sun ............................. 348/144 |

* cited by examiner

*Primary Examiner*—Que T. Le
(74) *Attorney, Agent, or Firm*—George D. Scile; Stephen B. Ackerman; Douglas R. Schnabel

(57) ABSTRACT

A new electronic imaging system is achieved. The system comprises a sensor having a first color region, a second color region, and a third color region. A prism system comprises a first prism having a first index of refraction and overlying the first color region. The first prism directs incident light of the first color to the first color region of the sensor. A second prism has a second index of refraction and overlies the second color region. The second prism directs incident light of the second color to the second color region of the sensor. A third prism has a third index of refraction and overlies the third color region. The third prism directs incident light of the third color to the third color region of the sensor.

25 Claims, 4 Drawing Sheets

US 6,984,812 B2

AUTO REGISTERED COMPONENT RGB IMAGING METHOD

This application claims priority to U.S. Provisional Application Ser. No. 60/450,088 filed on Feb. 26, 2003, and herein incorporated by reference.

BACKGROUND OF THE INVENTION (1) Field of the Invention

The invention relates to color imaging, and, more particularly, to a color-imaging sensor using color prisms.

(2) Description of the Prior Art

Several prior art inventions relate to imaging systems. U.S. Pat. No. 6,211,906 B1 to Sun describes an imaging spectrometer system for acquiring ground track images. A modified CCD video imager is provided having a detector array that is spectrally filtered by an attached linear variable interference filter. U.S. Pat. No. 5,333,076 to Wight describes a stabilized imaging system for aerial reconnaissance. Fixed and rotating prisms are used to improve image stability. A linear CCD array is used.

SUMMARY OF THE INVENTION

A principal object of the present invention is to provide an effective and very manufacturable imaging system.

A further object of the present invention is to provide a means to translate multiple color images into one dimension.

A yet further object of the present invention is to provide a reduced cost imaging sensor.

In accordance with the objects of this invention, an electronic imaging system is achieved. The system comprises a sensor having a first color region, a second color region, and a third color region. A prism system comprises a first prism having a first index of refraction and overlying the first color region. The first prism directs incident light of the first color to the first color region of the sensor. A second prism has a second index of refraction and overlies the second color region. The second prism directs incident light of the second color to the second color region of the sensor. A third prism has a third index of refraction and overlies the third color region. The third prism directs incident light of the third color to the third color region of the sensor.

Also in accordance with the objects of this invention, a method to form an electronic imaging system is achieved. The method comprises forming a plurality of light sensors on a semiconductor wafer. A plurality of prisms is formed overlying the light sensors. Each prism overlies one of the light sensors. Each prism has an index of refraction. Each prism has a height. Each prism directs incident light of a color to the light sensor underlying the prism.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present invention disclose an imaging sensor. It should be clear to those experienced in the art that the present invention can be applied and extended without deviating from the scope of the present invention.

This invention provides a method of separating an incoming light signal into red, green, and blue images translated in one dimension. Solid state sensors can be designed to minimize their bordering dimensions such that three adjacent sensor color regions can be packaged to provide auto registered three color imaging. This reduces the cost of the system and simplifies any correction needed. To further reduce costs, each sensor region is designed to be identical to allow for any three contiguous sensor color regions yielded from a wafer. These "superdie" are cut from the wafer without cutting the regions between the color regions of the sensor.

By using several optical glass elements with differing indices of refraction, the color components can be separated from each other in a linear fashion. This differs from a standard prism in that the color separation can be performed in a single plane. The optical elements can be fabricated into an assembly by attaching the three glass elements together. Rotational artifacts are not present, and this represents an improvement in traditional 3-CCD assemblies on prisms.

Figure 1:
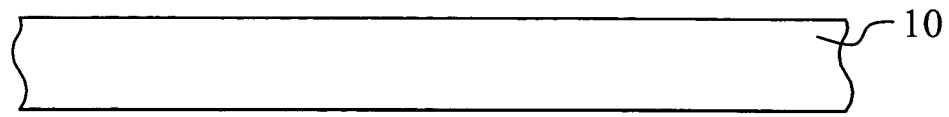
FIGS. 1 through 3 illustrates a preferred embodiment of the present invention showing the formation of the imaging sensor in cross-section.
Figure 2:
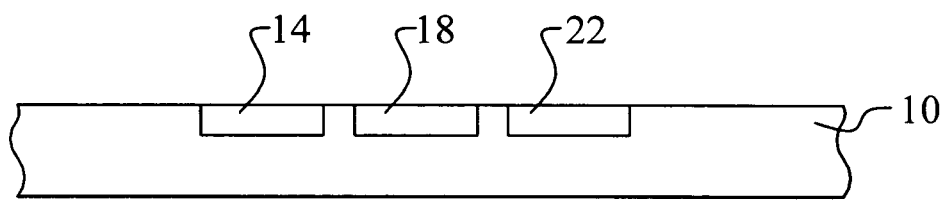
Figure 3:
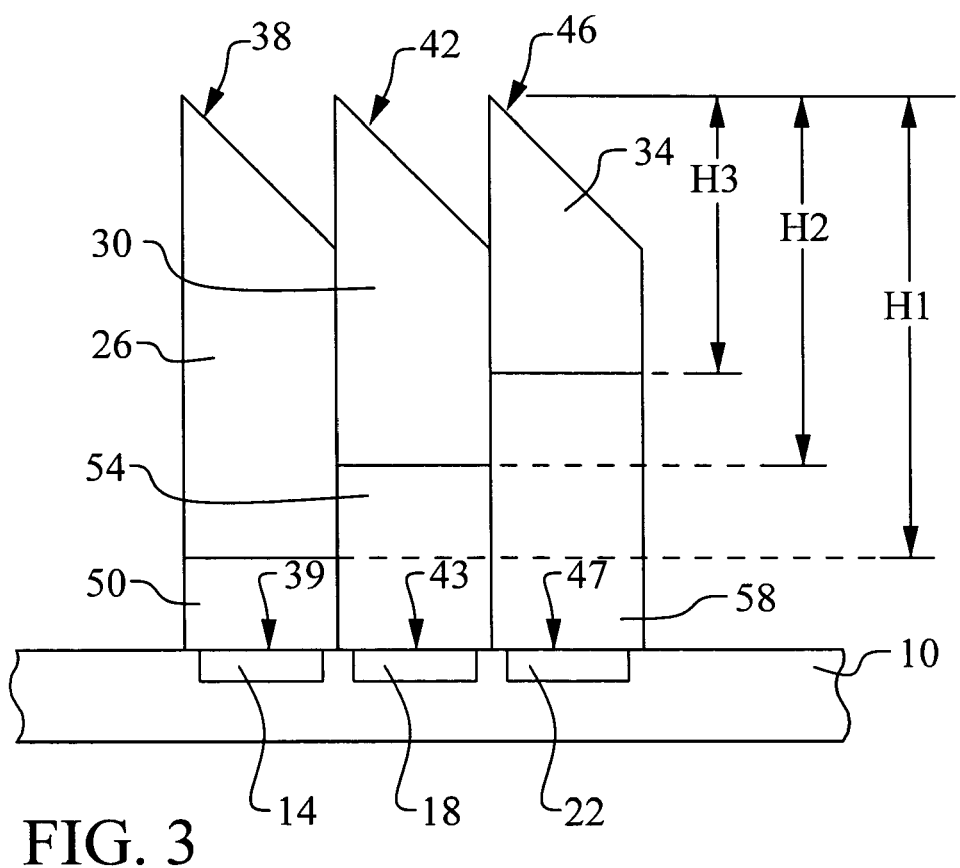

FIGS. 1 through 3 illustrated a preferred embodiment of the present invention. Referring particularly to FIG. 1, a cross section of a substrate 10 is shown. Preferably, the substrate 10 comprises a semiconductor material, such as monocrystalline silicon. Referring now to FIG. 2, sensor regions 14, 18, and 22 are formed in the substrate 10. These sensor regions 14, 18, and 22, are also called color regions because each region will be used to detect light of a particular color. The sensor regions 14, 18, and 22, comprise light sensing structures as are known in the art. For example, each color region may comprise a doped region, n-type or p-type, as part of a diode structure. It is known in the art that such diode structures will generate an electrical response to incident light and that this response is proportional to the intensity of the incident light. In the cross section, three color regions 14, 18, and 22, are depicted. However, preferably, a large number of light sensing regions are formed on the substrate 10.

Referring now to FIG. 3, several important features of the present invention are illustrated. A plurality of prisms 26, 30, and 34, are formed overlying the light sensing regions 14, 18, and 20. Each prism 26, 30, and 34, comprises a material with a relative high index of refraction. Preferably, the prisms 26, 30, and 34, of three adjacent color regions 14, 18, and 22, are structured to transmit three, different colors. For example, a first prism 26 may be structured to transmit the blue component of incident light to the underlying color region 14, while a second prism 30 is structured to transmit green light to the underlying color region 18, and a third prism 34 is structured to transmit red light to the underlying color region 22. In this scheme, the three adjacent color regions would be structured to especially detect blue, green, and red for a RGB detection scheme.

Each prism 26, 30, and 34, for a multiple color sensing imager as shown has a prism length. In the example case, the first prism 26 has a length H1, the second prism 30 has a length H2, and the third prism 34 has a length H3. It is the combination of the length and the index of refraction that causes each prism 26, 30, and 34, to transmit certain colors of incident light while reflecting other colors. Each prism 26, 30, and 34, preferably has a topmost surface 38, 42, and 46, that is at an angle with respect to the topmost surface 39, 43, and 47, of each color region 14, 18, and 22. These angled topmost surfaces allow each prism 26, 30, and 34, to both transmit and reflect incident light as is described below.

Figure 4:
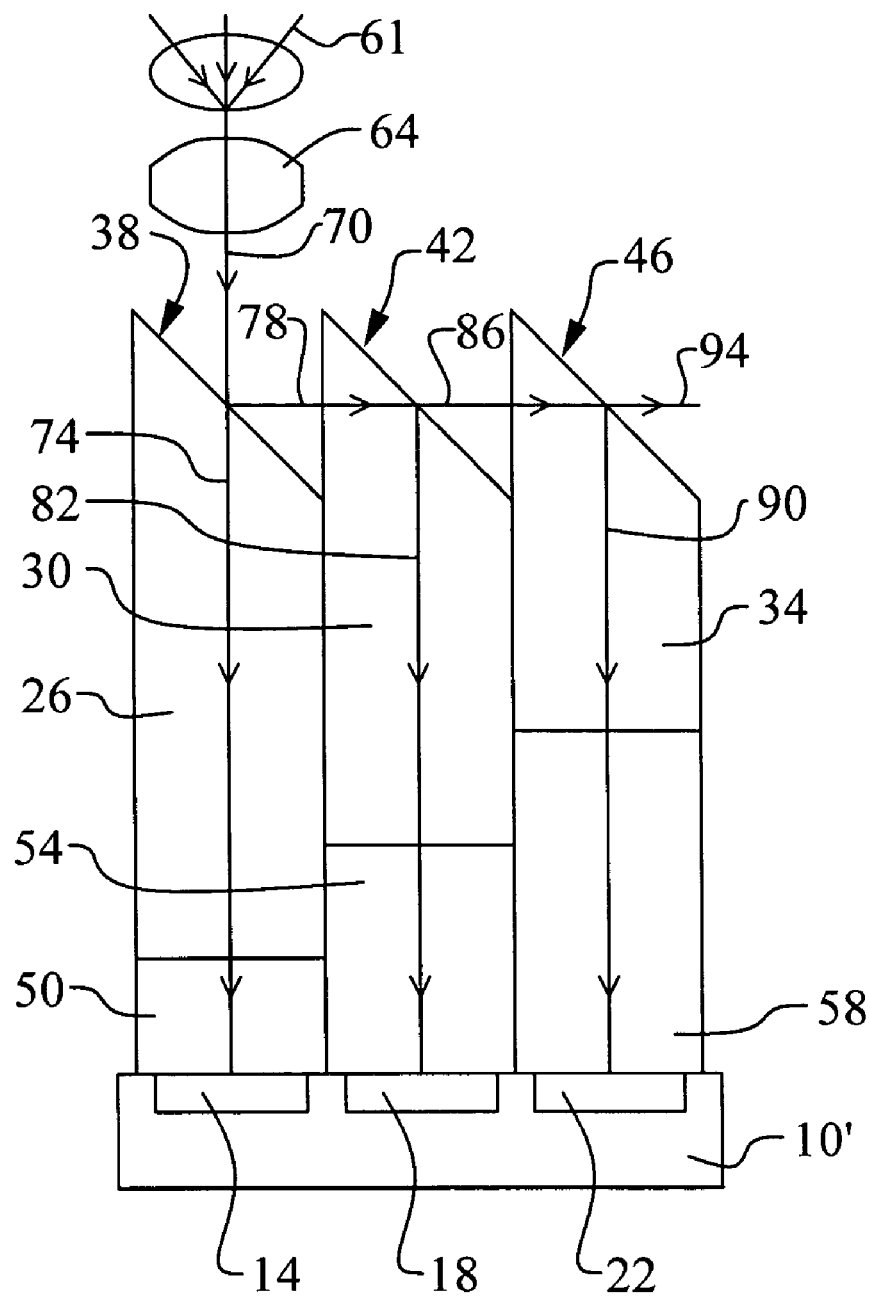
FIG. 4 illustrates the preferred embodiment of the present invention.
Figure 7:
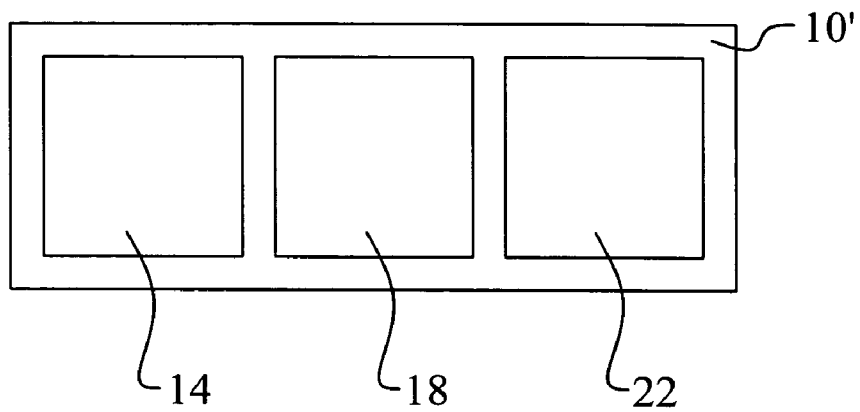
FIG. 7 illustrates the tri-color sensor in top view.

Referring now to FIG. 4, the preferred embodiment of a tri-color (RGB) imaging system is again shown in cross section. The illustration shows a system with a lens 64, prisms 26, 30, and 34, and color regions 14, 18, and 22 suitable for use with this invention. Referring to FIG. 7, a top view shows that the overall sensor 10' comprises a blue color region 14, a green color region 18, and a red color region 22. Referring again to FIG. 4, each of the prisms 26, 30, and 34, has a reflecting surface 38, 42, 46 corresponding to the topmost surface as described above. A first reflecting surface 38 is on the first prism 26, a second reflecting surface 42 is on the second prism 30, and a third reflecting surface 46 is on the third prism 34. Fill regions 50, 54, and 58 comprise a transparent material and are used to regulate the heights H1–H3 of the prisms.

In the schematic, the lens 64 focuses polychromatic, external light into a beam 70 incident on the first prism 26. Polychromatic light is light containing several colors of the visible spectrum as is typically useful in imaging applications. A particular type of polychromatic light is white light that comprises light frequencies across the visible spectrum. The first reflecting surface 38 is designed to reflect about two thirds of the polychromatic incident light beam 70 as the first reflected beam 78 while transmitting about one third of the incident light beam 70 as the first transmitted beam 74. If the first color region 14 is a blue region, then the blue components of the polychromatic light source 70 are transmitted in the first transmitted beam to the blue color region 14. The red and green components are reflected by the first reflecting surface 38 as the first reflected beam 78.

The second prism 30 is configured such that the first reflected beam 78 will intersect the second reflecting surface 42 of the second prism 30. Further, the second reflecting surface 42 is designed to transmit about one half of the remaining incident light 70 (the first reflected beam 78) and to reflect about one half of the remaining incident light beam 70 (the first reflected beam 78) to the second color region 18. As a result of the first reflected beam 78 intersecting the second reflecting surface 42, a second reflected beam 82 is directed to the second color region 18 and a second transmitted beam 86 is directed toward the third prism 34. If the second color region 18 is the green region, then the second reflected beam comprises the green color components of the polychromatic light 70.

The third reflecting surface 46 is designed to reflect about all of the remaining incident light beam (the second transmitted beam 86) to the third color region 22. The second transmitted beam 86 intersects the third reflecting surface 46 at the third prism 34 and the reflected light is the third reflected beam 90 that is directed to the third color region 22. Some light may be transmitted through the third reflecting surface 46 as the third transmitted beam 94. If the third color region is red, then the third reflected beam 90 comprises the red component of the polychromatic light 70.

Referring again to FIG. 3, the prisms 26, 30, and 34 comprise relative high indexes of refraction. The length H1 of the first prism 26 is preferably greater than the length H2 of the second prism 30. The length H2 of the second prism 30 is preferably greater than the length H3 of the third prism 34. The indexes of refraction and the lengths are chosen so that mostly blue light reaches the blue region 14 of the sensor 10, mostly green light reaches the green region 18 of the sensor 10, and mostly red light reaches the red region 22 of the sensor 10.

Figure 5:
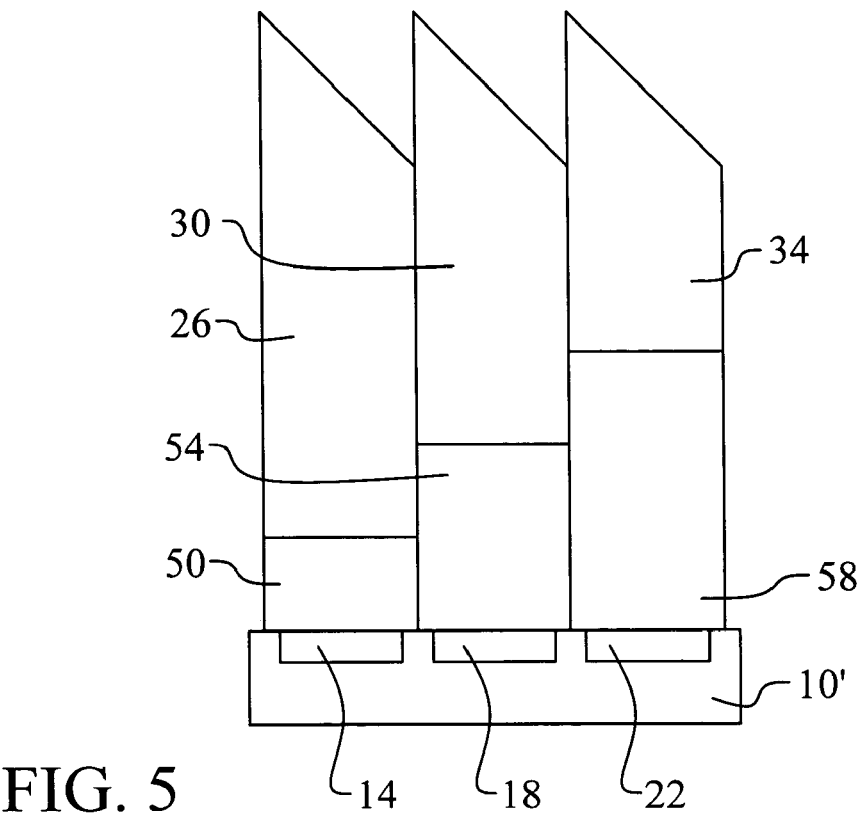
FIG. 5 illustrates a tri-color sensor of the present invention.

Referring now to FIG. 5, after the plurality of color regions 14, 18, and 22, and prisms 26, 30, and 34, are formed on the substrate 10, then the substrate 10 can be sawed to form a tri-color sensor 10' as shown. The design of the prisms 26, 30, and 34 allows sensors for the individual component colors (RGB) to be made in-line in a single super die that can be cut from a substrate wafer. This feature removes the need to align the sensors in a packaging step since the color regions of the sensor are aligned when they are formed together on the wafer as was shown in FIG. 7.

Figure 6:
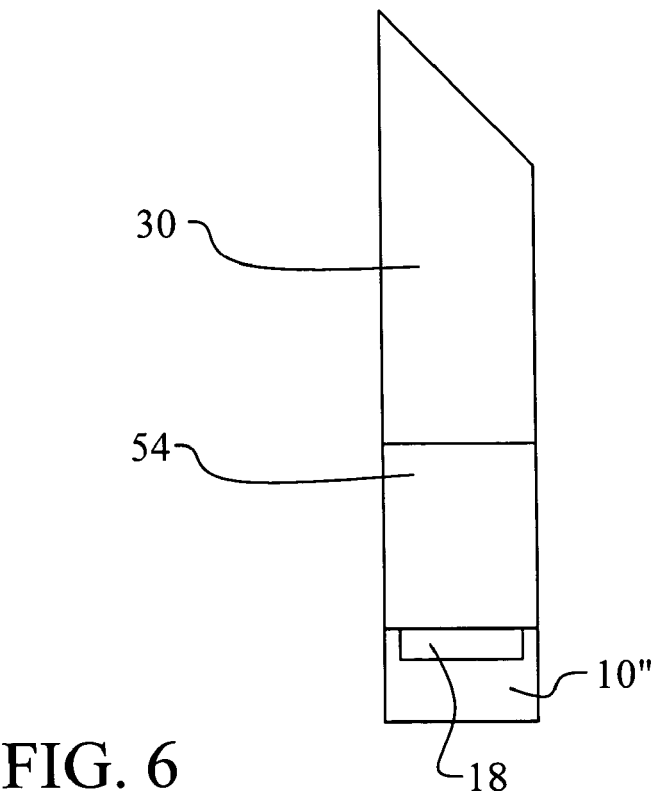
FIG. 6 illustrates a single color sensor of the present invention.
Figure 8:
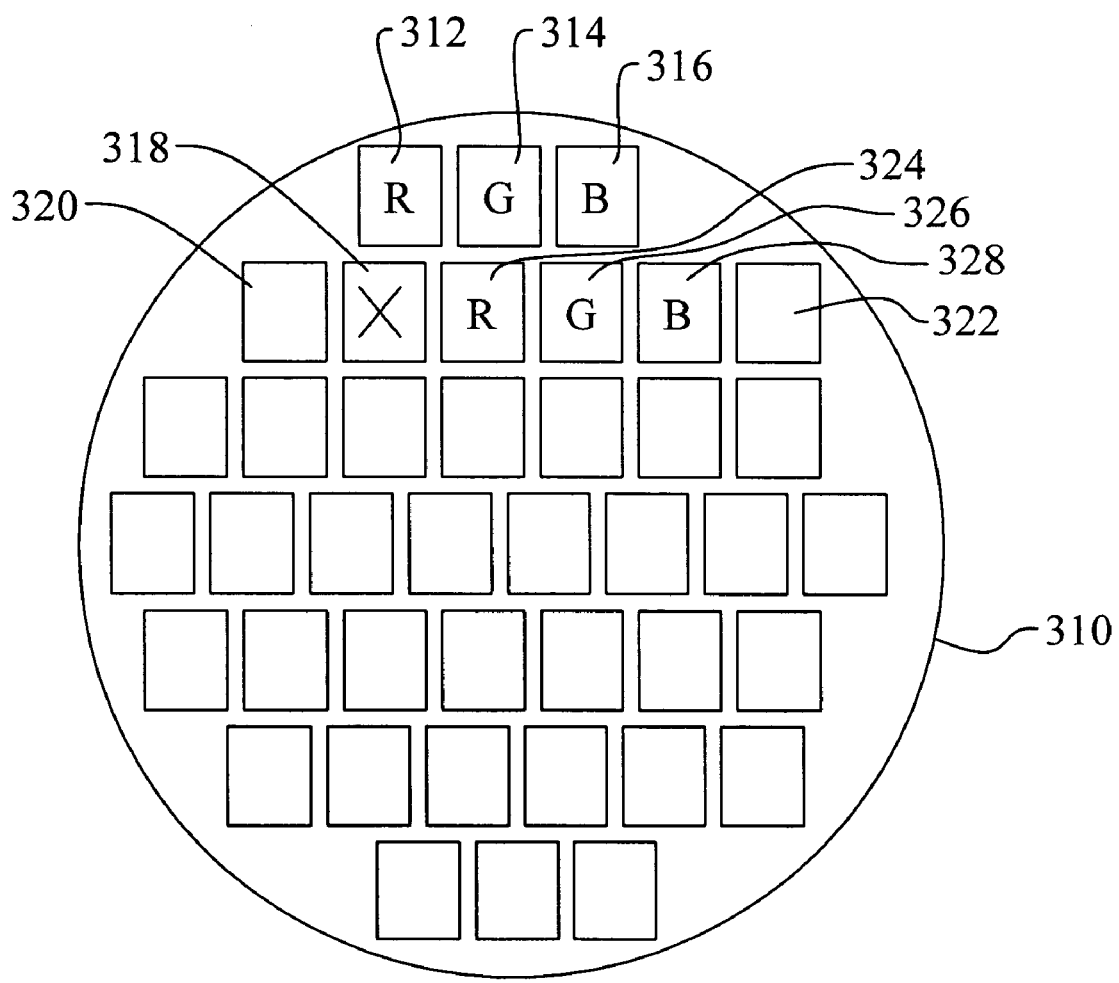
FIG. 8 illustrates a wafer level view of the present invention.

Referring now to FIG. 8, when all of the sensor color regions are the fabricated on a single wafer 310, then additional economic advantages may be realized. The wafer 310 has 40 color region positions 312, 314, 316, 318, 320, 322, 324, 326, and 328. A tri-color sensor may be formed according to the present invention by forming a red sensor region 312, a green sensor region 314, and a blue sensor region 316 in a row. Further, it is preferred that the sensor regions be tested prior to sawing the wafer into die. In this way, groups of wafers such as the red, green, and blue group 324, 326, and 328, can be kept together as a single die. That is, the wafer is sawed such that the red, green, and blue sensor regions 324, 326, and 328 are removed as a single, "super die" sensor. Alternatively, if one of the sensor regions of a group is defective then the remaining sensor regions can be sawed and removed to form single, monochromatic sensors 320. Referring now to FIG. 6, a single color, or monochromatic sensor, is shown with a single color region 18 and prism 30.

The advantages of the present invention may now be summarized. An effective and very manufacturable imaging system is achieved. A means to translate multiple color images into one dimension is provided. The resulting sensor has reduced cost.

As shown in the preferred embodiments, the novel device and method of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. An electronic imaging system comprising:
    a sensor having a first color region, a second color region, and a third color region; and
    a prism system comprising:
        a first prism having a first index of refraction and overlying said first color region wherein said first prism directs incident light of said first color to said first color region of said sensor;
        a second prism having a second index of refraction and overlying said second color region wherein said second prism directs incident light of said second color to said second color region of said sensor; and
        a third prism having a third index of refraction and overlying said third color region wherein said third prism directs incident light of said third color to said third color region of said sensor.

2. The system according to claim 1 wherein said first, second, and third color regions comprise red, green, and blue.

3. The system according to claim 1 wherein said first, second, and third indexes of refraction each differ one from another.

4. The system according to claim 1 wherein said first, second, and third prisms comprise first, second, and third heights, respectively, and wherein said first, second, and third heights each differ one from another.

5. The system according to claim 1 wherein each said prisms has a topmost surface and wherein each said topmost surface is angled with respect to the topmost surface of said sensor.

6. The system according to claim 1 wherein said second color region is arranged between said first and third color regions, wherein said first prism transmits a first part of polychromatic incident light to said first color region and reflects a second part of said polychromatic incident light to said second prism, wherein said second prism reflects a third part of said polychromatic incident light to said second color region and transmits a fourth part of said polychromatic incident light to said third prism, and wherein said third prism reflects a fifth part of said polychromatic incident light to said third color region and transmits a sixth part of said polychromatic incident light.

7. The system according to claim 6 wherein said first part, said third part, and said fifth part are each about one third of said polychromatic incident light.

8. The system according to claim 6 wherein said first, second, and third color regions comprise red, green, and blue.

9. The system according to claim 1 wherein said sensor comprises a single die of an semiconductor circuit wafer.

10. An electronic imaging system comprising:
   a sensor having a first color region, a second color region, and a third color region wherein said first, second, and third color regions comprise red, green, and blue; and
   a prism system comprising:
      a first prism having a first index of refraction and overlying said first color region wherein said first prism directs incident light of said first color to said first color region of said sensor;
      a second prism having a second index of refraction and overlying said second color region wherein said second prism directs incident light of said second color to said second color region of said sensor; and
      a third prism having a third index of refraction and overlying said third color region wherein said third prism directs incident light of said third color to said third color region of said sensor.

11. The system according to claim 10 wherein said first, second, and third indexes of refraction each differ one from another.

12. The system according to claim 10 wherein said first, second, and third prisms comprise first, second, and third heights, respectively, and wherein said first, second, and third heights each differ one from another.

13. The system according to claim 10 wherein each said prism has a topmost surface and wherein each said topmost surface is angled with respect to the topmost surface of said sensor.

14. The system according to claim 10 wherein said second color region is arranged between said first and third color regions, wherein said first prism transmits a first part of polychromatic incident light to said first color region and reflects a second part of said polychromatic incident light to said second prism, wherein said second prism reflects a third part of said polychromatic incident light to said second color region and transmits a fourth part of said polychromatic incident light to said third prism, and wherein said third prism reflects a fifth part of said polychromatic incident light to said third color region and transmits a sixth part of said polychromatic incident light.

15. The system according to claim 14 wherein said first part, said third part, and said fifth part are each about one third of said polychromatic incident light.

16. The system according to claim 10 wherein said sensor comprises a single die of an semiconductor wafer.

17. A method to form an electronic imaging system comprising:
   forming a plurality of light sensors on a semiconductor wafer; and
   forming a plurality of prisms overlying said light sensors wherein each said prism overlies one said light sensors, wherein each said prism has an index of refraction, wherein each said prism has a height, and wherein each said prism directs incident light of a color to said light sensor underlying said prism.

18. The method according to claim 17 wherein said prisms comprise first, second, and third said indexes of refraction corresponding to first, second, and third said colors.

19. The method according to claim 17 wherein said prisms comprise first, second, and third said heights corresponding to first, second, and third said colors.

20. The method according to claim 17 wherein each said prism has a topmost surface and wherein each said topmost surface is angled with respect to the topmost surface of said sensor.

21. The method according to claim 17 wherein said light sensors comprise first, second, and third color regions, wherein each said second color region is arranged between one of said first and one of said third color regions, wherein first said prisms overlie said first color regions, transmit a first part of polychromatic incident light to said first color regions, and reflect a second part of said polychromatic incident light to second said prisms, wherein said second prisms overlie said second color regions, reflect a third part of said polychromatic incident light to said second color regions, and transmit a fourth part of said polychromatic incident light to third said prisms, and wherein said third prisms reflect a fifth part of said polychromatic incident light to said third color regions and transmit a sixth part of said polychromatic incident light.

22. The method according to claim 21 wherein said first part, said third part, and said fifth part are each about one third of said polychromatic incident light.

23. The method according to claim 21 wherein said first, second, and third color regions comprise red, green, and blue.

24. The method according to claim 17 further comprising sawing said semiconductor substrate in areas between said light sensors to form tri-color sensors comprising three said light sensors and three said prisms.

25. The method according to claim 17 further comprising sawing said semiconductor substrate in areas between said light sensors to form single color sensors comprising one said light sensor and one said prism.

* * * * *

UNITED STATES PATENT AND TRADEMARK OFFICE
CERTIFICATE OF CORRECTION

PATENT NO. : 6,984,812 B2 Page 1 of 1
DATED : January 10, 2006
INVENTOR(S) : Nathaniel Joseph McCaffrey and Taner Dosluoglu It is certified that error appears in the above-identified patent and that said Letters Patent is hereby corrected as shown below:

<u>Title page,</u>
Item [74], *Attorney, Agent, or Firm*, delete "George D. Scile; Stephen B. Ackerman; Douglas R. Schnabel" and replace with -- George O. Saile; Stephen B. Ackerman; Doublas R. Schnabel --.

Signed and Sealed this

Sixth Day of June, 2006

JON W. DUDAS
*Director of the United States Patent and Trademark Office*